United States Patent [19]
Ceylan et al.

[11] Patent Number: 6,144,919
[45] Date of Patent: Nov. 7, 2000

[54] METHOD AND APPARATUS FOR USING NON-DIGITIZED CITIES FOR ROUTE CALCULATION

[75] Inventors: Timur Ceylan, Fremont; Laura White, San Jose; Jim Nolan, Santa Cruz, all of Calif.

[73] Assignee: Visteon Technologies, LLC, Sunnyvale, Calif.

[21] Appl. No.: 09/049,803

[22] Filed: Mar. 27, 1998

[51] Int. Cl.[7] ................................................ G06F 165/00
[52] U.S. Cl. ........................ 701/208; 701/209; 340/990; 340/995
[58] Field of Search ................................ 701/200, 202, 701/207, 208, 209, 210; 73/178 R; 340/988, 990, 995

[56] References Cited

U.S. PATENT DOCUMENTS

| | | | |
|---|---|---|---|
| 3,845,289 | 10/1974 | French ................................. | 235/151.2 |
| 4,570,227 | 2/1986 | Tachi et al. ........................... | 364/444 |
| 4,608,656 | 10/1986 | Tanaka et al. ........................ | 364/449 |
| 4,611,293 | 9/1986 | Hatch et al. .......................... | 364/571 |
| 4,672,565 | 6/1987 | Kuno et al. ........................... | 364/571 |
| 4,673,878 | 6/1987 | Tsushima et al. ..................... | 324/226 |
| 4,723,218 | 2/1988 | Hasebe et al. ........................ | 364/449 |
| 4,734,863 | 3/1988 | Honey et al. ......................... | 364/449 |
| 4,751,512 | 6/1988 | Longaker ............................. | 342/357 |
| 4,782,447 | 11/1988 | Ueno et al. ........................... | 364/449 |
| 4,796,191 | 1/1989 | Honey et al. ......................... | 364/450 |
| 4,797,841 | 1/1989 | Hatch ................................ | 364/571.04 |
| 4,831,563 | 5/1989 | Ando et al. ...................... | 364/571.05 |
| 4,862,398 | 8/1989 | Shimizu et al. .................. | 364/571.05 |
| 4,914,605 | 4/1990 | Loughmiller, Jr. et al. ............ | 364/518 |
| 4,918,609 | 4/1990 | Yamawaki ............................ | 364/449 |
| 4,926,336 | 5/1990 | Yamada ................................ | 364/444 |
| 4,937,753 | 6/1990 | Yamada ................................ | 364/449 |
| 4,964,052 | 10/1990 | Ohe ...................................... | 364/449 |
| 4,970,652 | 11/1990 | Nagashima ............................ | 364/449 |
| 4,982,332 | 1/1991 | Saito et al. ............................ | 364/449 |
| 4,984,168 | 1/1991 | Neukrichner et al. ................ | 364/449 |
| 4,989,151 | 1/1991 | Nuimura ............................... | 364/449 |
| 4,992,947 | 2/1991 | Nimura et al. ........................ | 364/444 |
| 4,996,645 | 2/1991 | Schneyderberg Van DerZon .. | 364/449 |
| 4,999,783 | 3/1991 | Tenmoku et al. ..................... | 364/450 |
| 5,040,122 | 8/1991 | Neukirchner et al. ................ | 364/449 |
| 5,046,011 | 9/1991 | Kakihara et al. ..................... | 364/449 |
| 5,060,162 | 10/1991 | Ueyama et al. ....................... | 364/449 |
| 5,177,685 | 1/1993 | Davis et al. ........................... | 364/443 |
| 5,272,638 | 12/1993 | Martin et al. ......................... | 364/444 |
| 5,283,743 | 2/1994 | Odagawa ............................. | 364/457 |
| 5,287,297 | 2/1994 | Ihara et al. ........................ | 364/571.02 |
| 5,297,050 | 3/1994 | Ichimura et al. ..................... | 364/444 |

(List continued on next page.)

FOREIGN PATENT DOCUMENTS

| | | |
|---|---|---|
| 0 485 120 A2 | 5/1992 | European Pat. Off. . |
| 0 575 943 1 | 12/1993 | European Pat. Off. . |
| 2 271 423A | 4/1994 | United Kingdom . |

OTHER PUBLICATIONS

French, *MAP matching Origins Approaches and Applications*, Rober L.French & Associates, 3815 Lisbon St., Suite 201, Fort Worth, Texas 76107, USA, pp. 91–116.

*Primary Examiner*—Gary Chin
*Attorney, Agent, or Firm*—Beyer Weaver & Thomas, LLP

[57] ABSTRACT

A method for selecting a destination in a vehicle navigation system is described. A plurality of options are provided for designating the destination in the system's user interface. A first option employs at least one street name to designate the destination. In response to selection of the first option, a list of cities is provided for display in the user interface. The list of cities includes a first plurality of cities for which no street names are available for display and a second plurality of cities for which only a few street names are available for display. In response to selection of one of the first plurality of cities from the list of cities, a first location associated with the selected city in the map database is selected as the destination. In response to selection of one of the second plurality of cities from the list of cities, an enhanced street name list is presented which includes the names of the few street names as well as an entry corresponding to a specific location in the selected city.

8 Claims, 6 Drawing Sheets

U.S. PATENT DOCUMENTS

| | | | |
|---|---|---|---|
| 5,337,244 | 8/1994 | Nobe et al. | 701/208 |
| 5,353,034 | 10/1994 | Sato et al. | 701/208 |
| 5,369,588 | 11/1994 | Hayami et al. | 364/449 |
| 5,410,485 | 4/1995 | Ichikawa | 364/444 |
| 5,412,573 | 5/1995 | Barnea et al. | 364/449 |
| 5,463,554 | 10/1995 | Araki et al. | 364/444 |
| 5,486,822 | 1/1996 | Tenmoku et al. | 340/995 |
| 5,506,774 | 4/1996 | Nobe et al. | 364/424.05 |
| 5,513,110 | 4/1996 | Fujita et al. | 364/449 |
| 5,519,619 | 5/1996 | Seda | 364/444 |
| 5,521,826 | 5/1996 | Matsumoto | 364/449 |
| 5,784,059 | 7/1998 | Morimoto et al. | 701/208 |
| 5,797,112 | 8/1998 | Komatsu et al. | 701/208 |
| 5,819,200 | 10/1998 | Tamai et al. | 701/208 |
| 5,825,306 | 10/1998 | Hiyokawa et al. | 701/209 |
| 5,832,408 | 11/1998 | Tamai et al. | 701/208 |
| 5,893,898 | 4/1999 | Tanimoto | 701/209 |
| 5,919,245 | 7/1999 | Nomura | 701/209 |
| 5,941,930 | 8/1999 | Morimoto et al. | 701/208 |
| 5,948,042 | 9/1999 | Heimann et al. | 701/208 |
| 5,964,821 | 10/1999 | Brunts et al. | 701/209 |

METHOD AND APPARATUS FOR USING NON-DIGITIZED CITIES FOR ROUTE CALCULATION

BACKGROUND OF THE INVENTION

The present invention relates to the selection of a destination for route calculation in a vehicle navigation system. More specifically, the present invention provides a means by which a user of a vehicle navigation system may conveniently select a city as a destination even where the streets of that city have not been digitized and included in the system's map database.

In currently available vehicle navigation systems, the user may specify a desired destination in a variety of ways. For example, when it is known, the user may specify the street address of the destination. Alternatively, the user may specify an intersection of two roads in the vicinity of the destination. Once the user selects one of these alternative methods for designating the destination, the user is typically prompted to select a city from a displayed city list. In response to selection of a city, the user is then prompted to select the appropriate street or streets from a displayed list of streets corresponding to the selected city. Obviously, for either of these alternatives to be available, the streets of the city in which the destination is located must be represented by digitized data in the system's map database. However, because there are many small towns outside of major urban areas which have not yet been digitized, the map databases commonly used in commercially available systems do not have much, if any, street data for such towns.

FIG. 1 is a flowchart 100 illustrating a particular method for selecting a destination for route calculation using a street address. Once the user selects the street address option for specifying a destination (102), a city list 152 is presented (104) which includes all of the cities for which digitized street data exist in map database 154, i.e., digitized cities. Upon selection of a particular city by the user (106), a street name list 156 is presented (108) which includes all of the streets in map database 154 corresponding to the selected city. Upon selection of a street name by the user (110), the user is prompted to enter a street address (112). Once a valid street address is entered (114), the navigation system employs the specified address as the destination for route calculation (116).

FIG. 2 is a flowchart 200 illustrating another method for selecting a destination for route calculation using an intersection. Once the user selects the intersection option for specifying a destination (202), a city list 152 is presented (204) which includes all of the cities for which digitized street data exist in map database 154, i.e., digitized cities. Upon selection of a particular city by the user (206), a first street name list 156 is presented (208) which includes all of the streets in map database 154 corresponding to the selected city. Upon selection of a first street name by the user (210), a cross street name list 252 is presented (212) which includes all cross streets corresponding to the selected street name. When a cross street is selected (214), the corresponding intersection is then used as the destination for route calculation (216).

As discussed above, when a user indicates a desire to designate a specific street address or intersection, the user is typically presented with a list of cities. However, if the streets of the town in which the destination is located are not included in the system's map database, the town is not included in the city list. That is, the city list displays only cities and towns for which digitized street data are stored in the map database. Non-digitized cities are not represented in the city list.

As an alternative to the destination selection methods described above, some systems also allow the user to specify a point of interest (POI) such as, for example, an amusement park or a restaurant. In some systems, city centers or downtown areas are included as a POI category. In response to the selection of the city center category, a list of cities and towns is displayed. In contrast with the city list described above, this city center list includes towns for which digitized street data are not available. The centers or downtown areas of such towns are represented in the map database as a single location with reference to, for example, a highway which passes through the town and for which map data are available.

FIG. 3 is a flowchart 300 illustrating a method for selecting a destination for route calculation using points of interest (POI) such as, for example, amusement parks, museums, restaurants, and downtown areas or city centers. When a user of the vehicle navigation system selects the POI option (302), a list of POI categories 352 is displayed (304) which includes a number of categories of points of interest stored in map database 154. When the user selects a POI category (306) and the category is city centers (308), a city center list 354 is displayed (310) which includes all of the cities in map database 154 regardless of whether database 154 has digitized street data for the listed cities. That is, both digitized and non-digitized cities are represented in city center list 354. Once the user selects one of the city centers (312), the city center is used as the destination for route calculation (318). Where, on the other hand, some other POI category is selected, the appropriate POI list 356 corresponding to the selected category is displayed (314). Individual POI lists 354 and 356 may either be generated during database compilation, or on the fly during system operation from a single large POI list which includes POIs across all categories. Upon selection of a particular POI (316), the selected POI is used as the destination for route calculation (318).

The problem with currently available systems is that once a user selects the street address or intersection options, it is not apparent to the user why a particular city or town is not included in the displayed city list. Neither is it apparent that a city omitted from the city list might be included in the more inclusive city center list among the POI categories. This tends to be confusing for many users who justifiably assume that the system cannot be used to navigate to the desired destination. This, in turn, defeats the purpose of providing a vehicle navigation system. It is therefore desirable to provide a method for selecting a destination in a vehicle navigation system which allows the user to more easily identify and designate towns for which street data are not available.

SUMMARY OF THE INVENTION

According to the present invention, a vehicle navigation system is provided which allows the user to easily select a destination for the purpose of route calculation by designating the city in which the destination is located regardless of whether street data is available for the city. The present invention accomplishes this by displaying a more inclusive city list in response to selection by the user of a destination selection option which relies on the availability of street data. That is, if a user indicates a desire to designate a destination using a street address, a city list is displayed which includes non-digitized cities, i.e., cities for which no street data are available in the system's map database. Thus, even where the destination is in a non-digitized city the user may still select the city as the destination city without having to go look for it elsewhere. Of course, when a non-digitized city is selected, the user will not be able to specify a street address. Instead, the city center or downtown area of the selected city will be designated as the destination.

Thus, according to the present invention, a method for selecting a destination in a vehicle navigation system is provided. A plurality of options are provided for designating the destination in the system's user interface. A first option employs at least one street name to designate the destination. In response to selection of the first option, a list of cities is provided for display in the user interface. The list of cities includes a first plurality of cities for which no street names are available for display. In response to selection of a first one of the first plurality of cities from the list of cities, a first location associated with the first one of the first plurality of cities in the map database is selected as the destination.

According to a specific embodiment, sparsely digitized cities are also included in the list of cities. That is, the list includes cities for which only selected roads are digitized. In response to selection of a sparsely digitized city from the city list, a street name list is provided which includes the street names for the digitized roads and an entry corresponding to a specific location in the selected city.

A further understanding of the nature and advantages of the present invention may be realized by reference to the remaining portions of the specification and the drawings.

DESCRIPTION OF SPECIFIC EMBODIMENTS

Figure 4:
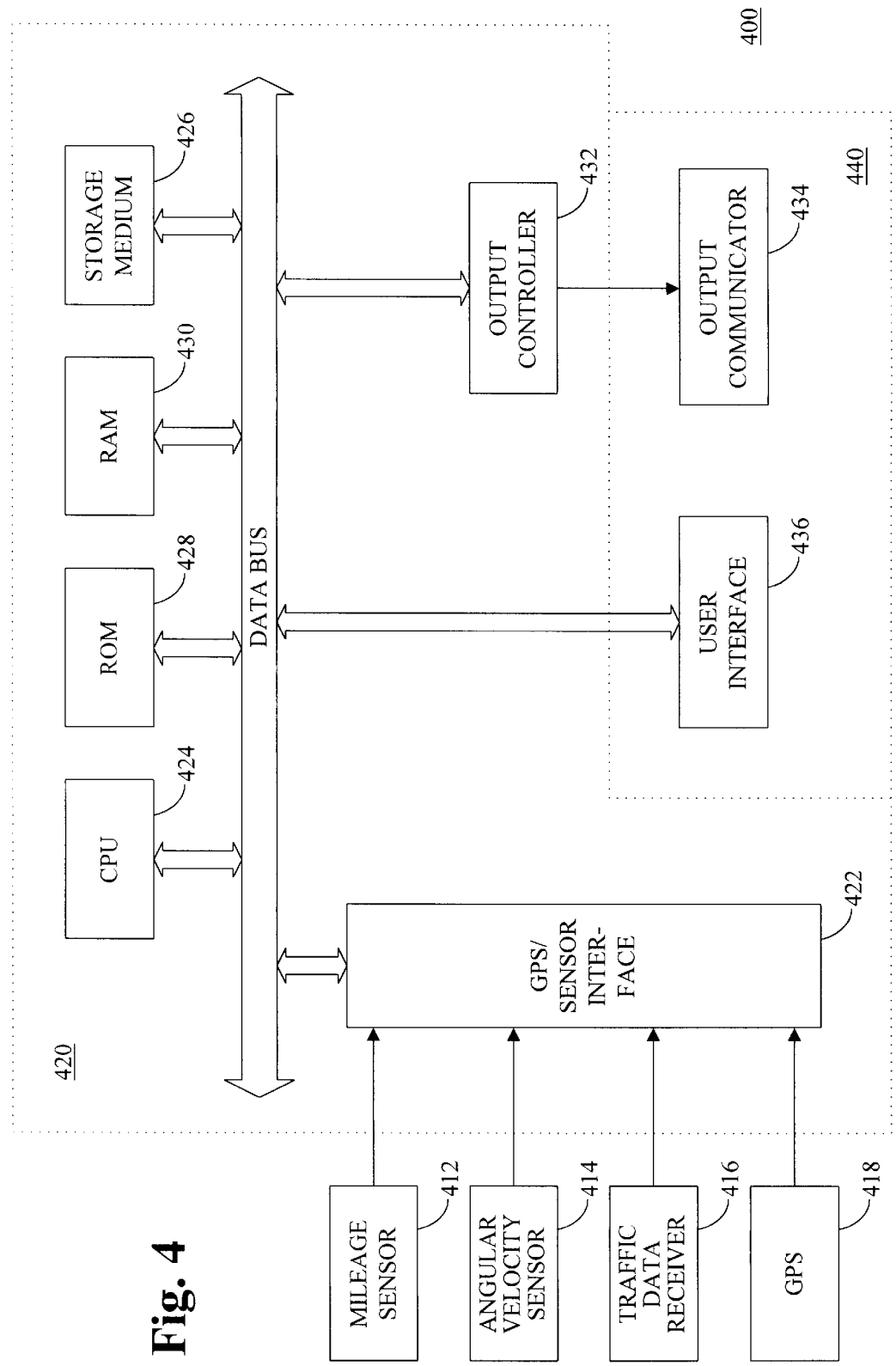
FIG. 4 is a block diagram of a specific embodiment of a vehicle navigation system for use with the present invention.

FIG. 4 is a block diagram of a specific embodiment of a vehicle navigation system 400 for use with the present invention. Sensors 412 and 414, traffic data receiver 416, and GPS receiver 418 are coupled to computing means 420 through GPS/sensor interface 422. In typical embodiments, mileage sensor 412 comprises an odometer, and angular velocity sensor 414 comprises a gyroscope, or a differential odometer coupled to the wheels of the vehicle. Traffic data receiver 416 may comprise any of a wide variety of RF receivers which are operable to receive real time traffic data transmitted in a variety of formats. A global positioning system (GPS) data receiver 418 is provided for receiving signals from, for example, a satellite-based navigation system. Data from GPS/sensor interface 422 is transmitted to CPU 424, which performs calibration, signal processing, dead-reckoning, vehicle positioning, and route calculation and guidance functions. A database containing map information may be stored in database medium 426, with software directing the operation of computing means 420 stored in main memory 428 for execution by CPU 424. Memory 428 may comprise any of a wide variety of non-volatile memory such as, for example, read-only memory (ROM), reprogrammable non-volatile memory such as flash memory or SRAM, or any other type of memory such as CD ROM, optical disk, or one or more PCMCIA cards. System RAM 430 permits reading and writing of the information necessary to execute such software programs. Database medium 426 may comprise non-volatile memory, a hard disk drive, CD-ROM, or an integrated circuit in which digitized map information has been stored. Output controller 432, which may comprise a graphics controller, receives data processed by CPU 424 and transmits the data to display console 440 which includes output communicator 434, usually comprising a display screen. The user may input data, such as a desired destination, through user interface 436, typically comprising a keyboard.

The map database stored in database medium 426 preferably comprises positional data such as, for example, latitude and longitude coordinates, to describe road intersections or nodes, road segments, landmarks and points of interest, and other geographical information. The data base may further comprise data representing characteristics of roads or places on the map, such as road and place names, road features such as dividers, one-way restrictions, surface, speed limit, shape, elevation, and other properties. According to specific embodiments of the invention, the map database includes cost values associated with individual nodes and road segments. These cost values correspond to the estimates of time intervals for traversing the respective node or segment. Node cost values take into consideration such information as, for example, whether the vehicle would encounter oncoming traffic, thus delaying a left turn maneuver. Segment costs reflect road segment characteristics such as speed limit and segment length, both of which affect the travel time along the segment. Also associated with each road in the map database is a hierarchy value which relates to the category or type of the road. For example, the highest level category of the hierarchy includes freeways end expressways. The lowest level includes residential streets and/or alleys. The information stored in map database medium 426 is employed with the data received from interface 422 for route calculation and guidance. Examples of route calculation and guidance techniques for use with the present invention are described in commonly assigned, copending U.S. patent application Ser. No. 08/784,204 for ROUTE GENERATION IN A VEHICLE NAVIGATION SYSTEM filed on Jan. 15, 1997, the entire specification of which is incorporated herein by reference for all purposes.

Figure 1:
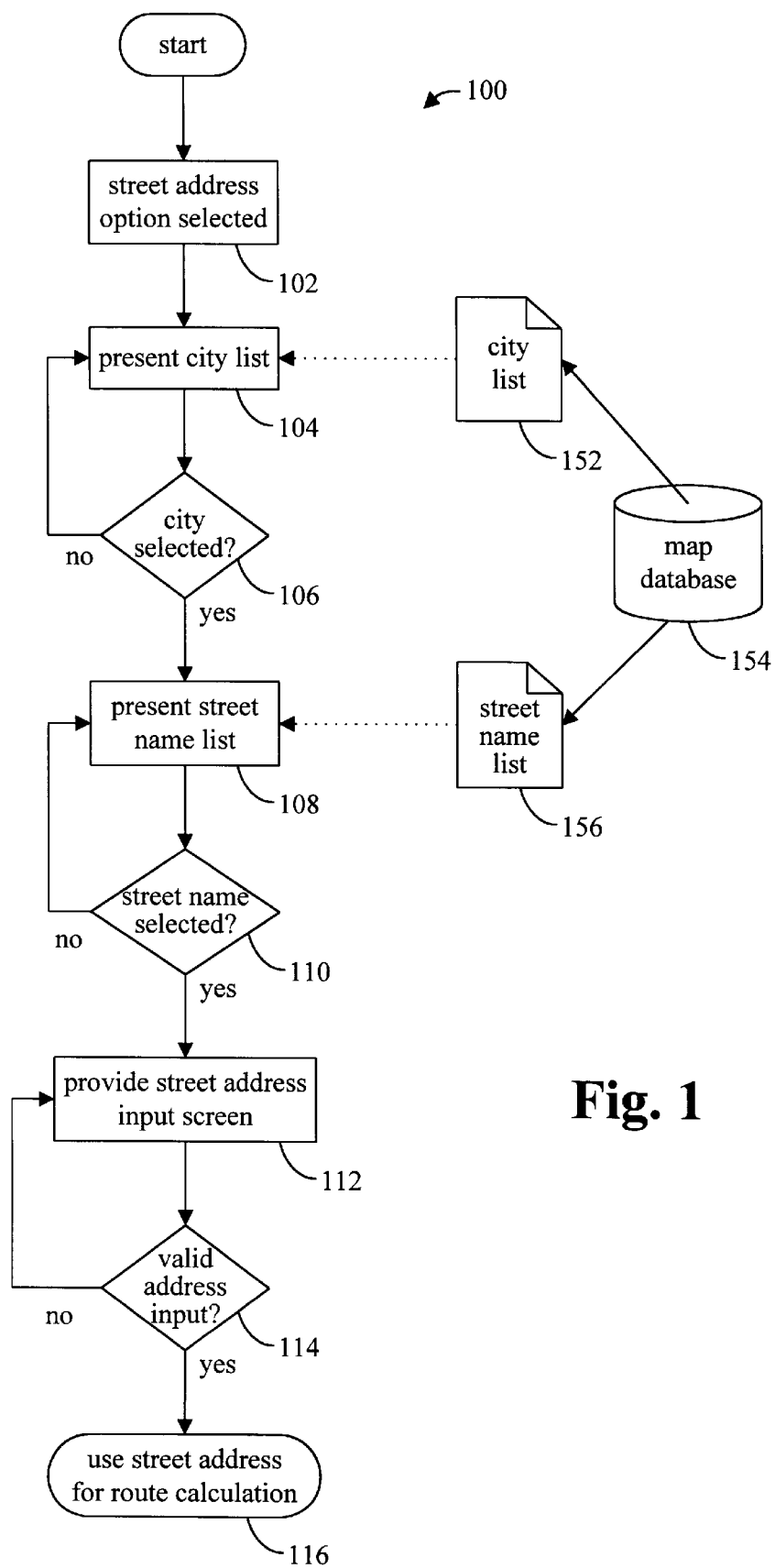
FIG. 1 is a flowchart illustrating a first method for selection of a destination for route calculation according to the prior art.
Figure 2:
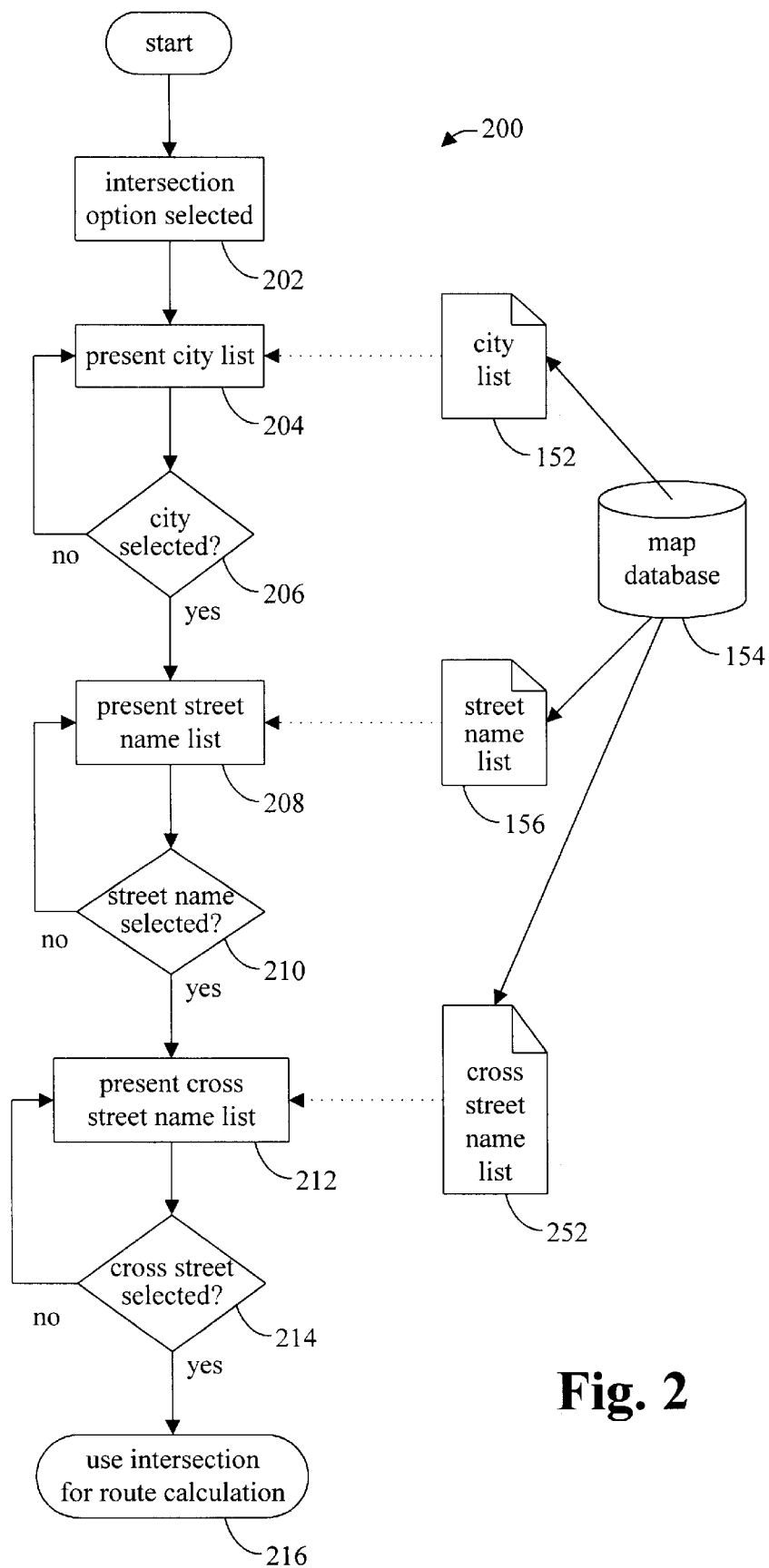
FIG. 2 is a flowchart illustrating a second method for selection of a destination for route calculation according to the prior art.
Figure 3:
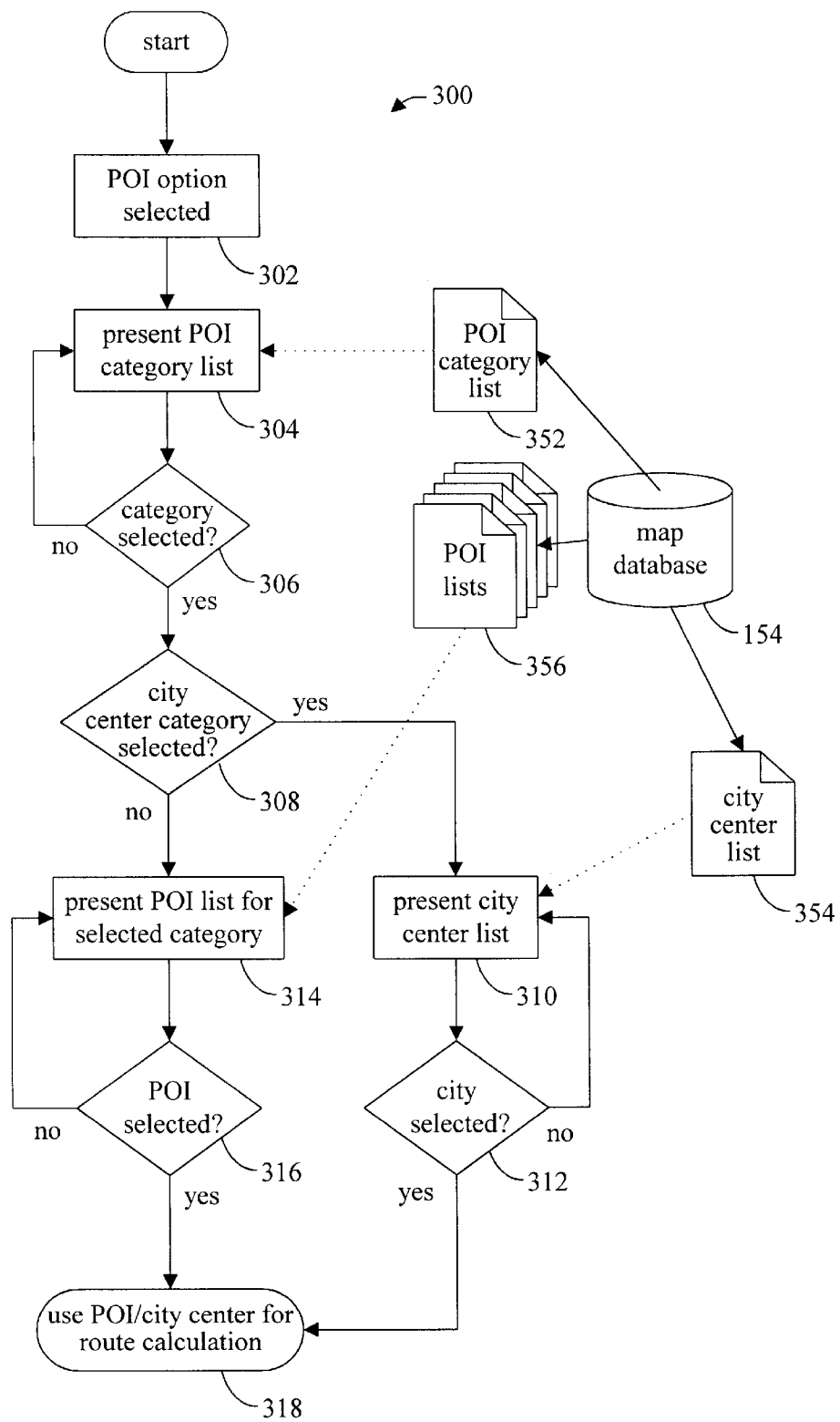
FIG. 3 is a flowchart illustrating a third method for selection of a destination for route calculation according to the prior art.
Figure 5:
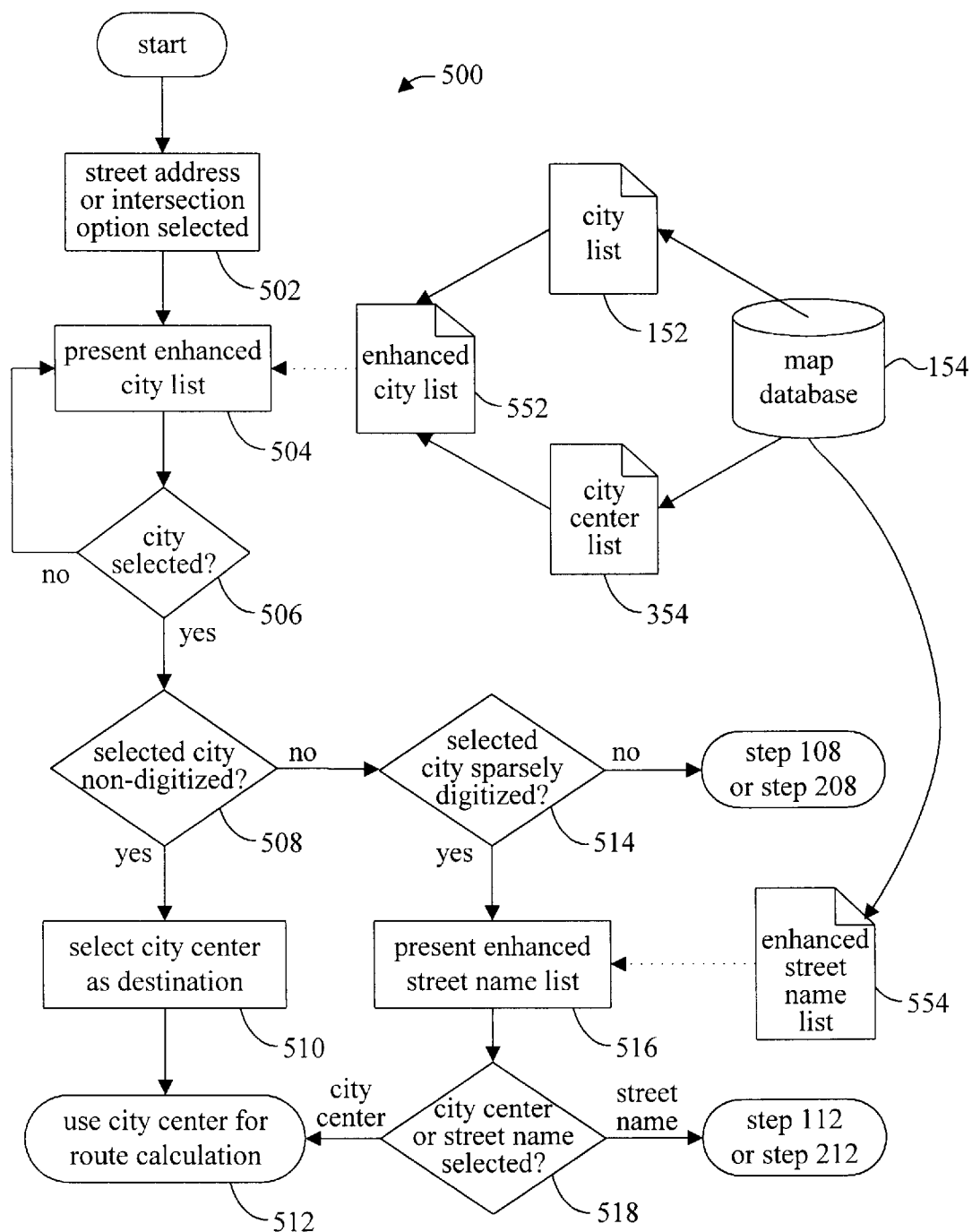
FIG. 5 is a flowchart illustrating selection of a destination for route calculation according to a specific embodiment of the invention.

FIG. 5 is a flowchart 500 illustrating selection of a destination for route calculation according to a specific embodiment of the invention. It should be noted that the use of the term "list" herein is for illustrative purposes and should not be used to restrict the scope of the invention. As used herein, the term "list" refers to an organized collection of data such as, for example, an alphanumerically organized list on a display screen, or a corresponding data table in a database having data therein which corresponds to the alphanumeric entries. When the user of the vehicle navigation system of the present invention selects the street address or intersection option for designating a destination (502), an enhanced city list 552 is displayed (504) which includes all of the cities from city list 152 and city center list 354, i.e., both the digitized and non-digitized cities represented in map database 154. Enhanced city list 552 may be generated during compilation of database 154 or, alternatively, on the fly while the navigation system is operating by referring to city list 152 and city center list 354. Upon selection of a city (506) which is non-digitized (508), the city center data are returned as the destination (510) which is then used for route calculation (512). Where the selected city is a digitized city, i.e., map database 154 contains digitized street data for the selected city, designation of the destination continues in the conventional manner as described above with reference to FIGS. 1 and 2. That is, if the street address option was selected the process proceeds from step 108, and if the intersection option was selected the process proceeds from step 208.

Thus, even where the intended destination is within a non-digitized city, the user may still select the street address or intersection options for designating the destination. Obviously, the user will not be able to enter a specific address or select a particular intersection in the non-digitized city, but will at least be able to select the city center without having to "back out" of the selection process and select the city center as a point of interest. This is particularly important where, as in the case of a rental car, the user is not familiar with either the navigation system interface or the local geography.

It will be understood that city center list 354 will also typically include sparsely digitized cities for which only selected roads are represented in the database. According to a specific embodiment, when such a city is selected, the user is presented with an enhanced street list including the digitized streets corresponding to the selected city and also including a specific location in, for example, a downtown area. Thus, the user is provided with a selection option even where a desired street name is not available.

Therefore, referring back to FIG. 5, where the selected city is not a non-digitized city (508), but is rather a sparsely digitized city (514) an enhanced street name list 554 is presented (516) which includes an entry corresponding to, for example, the city center of the selected city. Where the city center is selected from the list 554 (518), it is used as the destination for route calculation (512).

Where the selected city is a digitized city, i.e., map database 154 contains substantially comprehensive digitized street data for the selected city, designation of the destination continues in the conventional manner as described above with reference to FIGS. 1 and 2. That is, if the street address option was selected the process proceeds from step 108, and if the intersection option was selected the process proceeds from step 208. In addition, where a street name is selected from enhanced street name list 554 at step 518, designation of the destination also continues in the conventional manner as described above with reference to FIGS. 1 and 2. That is, if the street address option was selected the process proceeds from step 112, and if the intersection option was selected the process proceeds from step 212.

Figure 6:
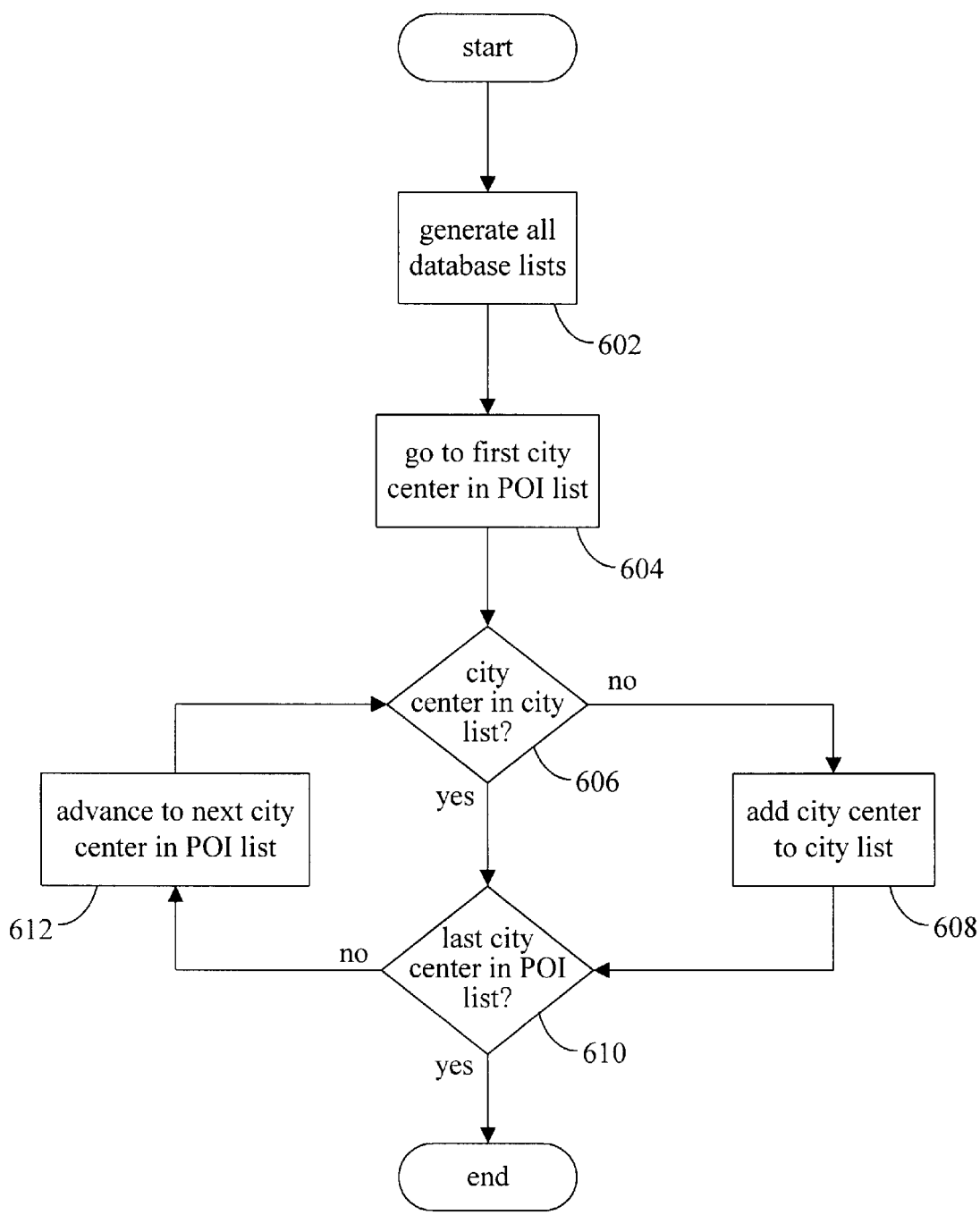
FIG. 6 is a flowchart illustrating generation of an enhanced city list according to a specific embodiment of the invention.

FIG. 6 is a flowchart 600 illustrating generation of an enhanced city list according to various specific embodiments of the invention. According to a first embodiment, generation of the enhanced city list by the process illustrated in FIG. 6 occurs during compilation of the system's map database. That is, during the initial system configuration, a permanent enhanced city list is generated for use in place of the city list during normal system operation. According to a second embodiment, the process of FIG. 6 beginning at 604 occurs "on the fly", i.e., while the vehicle navigation system is operating. That is, an enhanced city list is generated from the city list and city center POI data, for example, after system boot-up, or in response to a user's request to view the city list.

During the initial compilation of the navigation system's map database a plurality of the lists employed by the various system processes during normal system operation are generated (602) from the raw data in the database provided by any of a variety of vendors. Such lists include, for example, lists of states, counties, cities, roads, points of interest (POIs), etc. The POI list generated during this compilation may comprise a single large list of all points of interest (e.g., amusement parks, restaurants, city centers, etc.) in the database. Alternatively, individual POI lists may be generated during database compilation for each POI category. It will be understood that, in any case, the POI data may be organized in a variety of ways without departing from the scope of the invention.

After generation of the various database lists, process 600 goes to the first city center in the appropriate POI list (604). This may be either a POI list including all types of POIs or a POI list of city centers depending upon the nature of the lists generated in 602. If the first city center in the POI list is not represented in the city list (606), the city center is added to the city list (608) thereby altering the city list and beginning generation of an enhanced city list. If the city center most recently added to the enhanced list is not the last one in the POI list (610), the process advances to the next city center in the POI list (612) and determines whether it is represented in the city list (606). If a particular city center is already represented in the city list the process again determines whether the city center is the last one in the POI list (610) and, if not, moves to the next city center entry in the POI list (612). If, however, the last city center in the POI list has been reached, the process ends and the enhanced city list is complete.

While the invention has been particularly shown and described with reference to specific embodiments thereof, it will be understood by those skilled in the art that changes in the form and details of the disclosed embodiments may be made without departing from the spirit or scope of the invention. For example, although specific examples of the street address, intersection, and POI methods for selecting a destination have been discussed herein, such selection methods may be implemented in a variety of ways without departing from the scope of the invention. Moreover, if a map database has some intermediate level of digitization for a particular city, i.e., only major streets are included in the database, a selection option may be presented in the street name list, for example, which allows the user to select the city center or some other significant landmark where the desired street is not included in the list. Therefore, the scope of the invention should be determined with reference to the appended claims.

What is claimed is:

1. A method for selecting a destination in a vehicle navigation system, the system having a user interface and a map database associated therewith, the method comprising:

providing a plurality of options for designating the destination in the user interface, a first option employing at least one street name to designate the destination;

in response to selection of the first option, providing a city list for display in the user interface, the city list including a first plurality of cities for which no street names are available for display; and in response to selection of a first one of the first plurality of cities from the city list, selecting as the destination a first location associated with the first one of the first plurality of cities in the map database.

2. The method of claim 1 wherein the plurality of options comprises a street address option wherein the destination is designated using a street address.

3. The method of claim 1 wherein the plurality of options comprises a street intersection option wherein the destination is designated using an intersection of two streets in the map database.

4. The method of claim 1 wherein the first location comprises a downtown location corresponding to the first one of the first plurality of cities.

5. The method of claim 1 wherein the city list includes a second plurality of cities for each of which only selected street names associated therewith are available for display, the method further comprising, in response to selection of a first one of the second plurality of cities from the city list, providing a street name list, the street name list including the selected street names associated with the first one of the second plurality of cities and an entry corresponding to a second location associated with the first one of the second plurality of cities.

6. The method of claim 5 wherein the second location comprises a downtown location corresponding to the first one of the second plurality of cities.

7. A vehicle navigation system, comprising:
- a plurality of sensors for detecting a current vehicle position and a vehicle heading, and generating signals indicative thereof;
- a user interface for communicating navigation information to a user;
- a database medium having a map database stored therein; and
- a processor coupled to the sensors, the user interface, and the database medium, the processor being operable to:
  - provide a plurality of options for designating the destination in the user interface, a first option employing at least one street name to designate the destination;
  - in response to selection of the first option, provide a city list for display in the user interface, the city list including a first plurality of cities for which no street names are available for display; and
  - in response to selection of a first one of the first plurality of cities from the city list, select as the destination a first location associated with the first one of the first plurality of cities in the map database.

8. A computer program product for selecting a destination in a vehicle navigation system, the system having a user interface and a map database associated therewith, comprising:
- a computer-readable medium; and
- a computer program mechanism embedded in the computer-readable medium for causing a computer to perform the steps of:
  - providing a plurality of options for designating the destination in the user interface, a first option employing at least one street name to designate the destination;
  - in response to selection of the first option, providing a city list for display in the user interface, the city list including a first plurality of cities for which no street names are available for display; and
  - in response to selection of a first one of the first plurality of cities from the city list, selecting as the destination a first location associated with the first one of the first plurality of cities in the map database.

* * * * *